May 16, 1933.  V. J. AUCIUNAS  1,908,808
TIRE ARMOR
Original Filed June 17, 1929
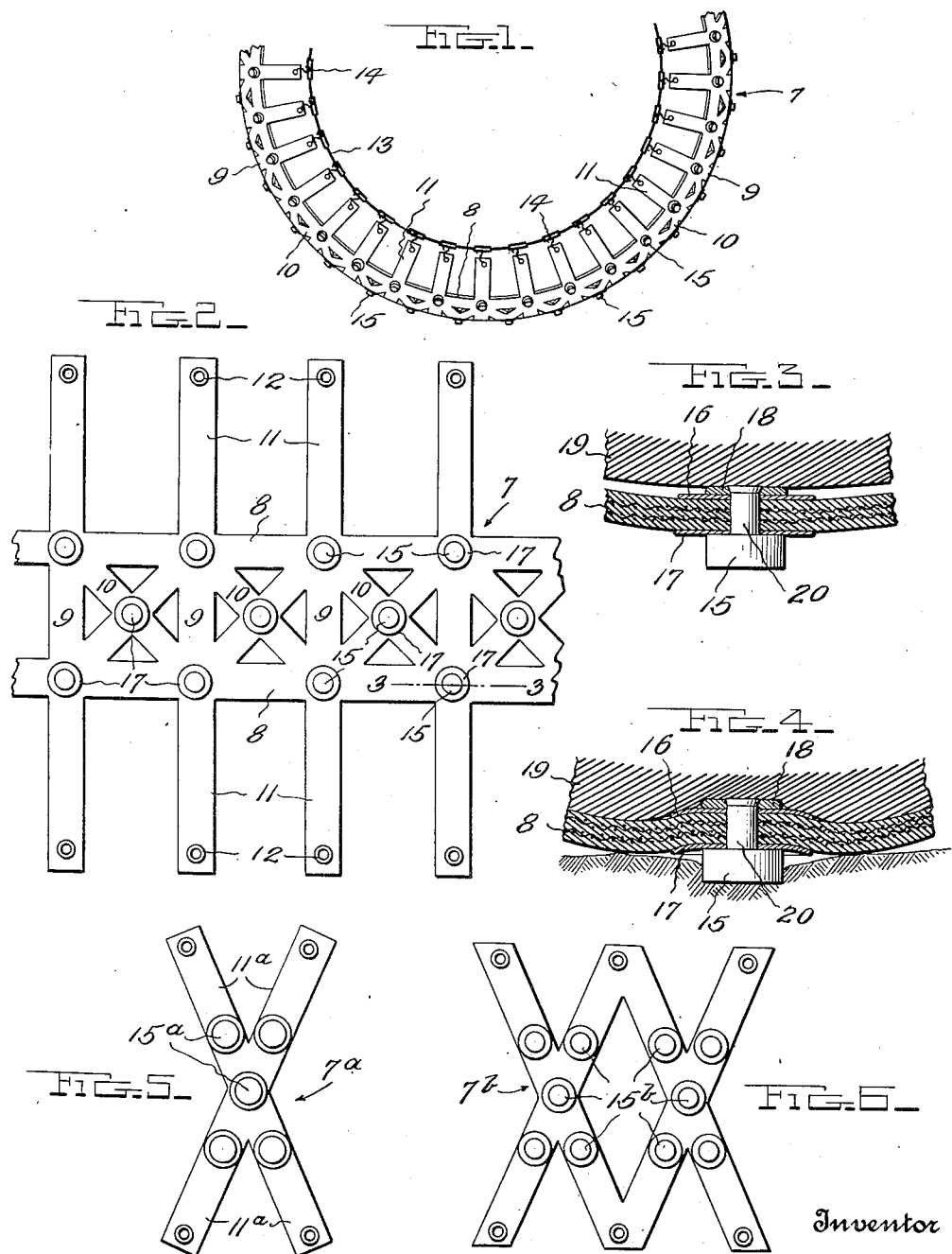
Witness
J. R. Pierce.
Inventor
Vincent J. Auciunas.
By H. B. Willson & Co.
Attorneys Patented May 16, 1933

1,908,808

UNITED STATES PATENT OFFICE

VINCENT J. AUCIUNAS, OF AMSTERDAM, NEW YORK

TIRE ARMOR

Application filed June 17, 1929, Serial No. 371,570. Renewed September 29, 1932.

The invention aims to provide a rather simple and inexpensive, yet an efficient and desirable armor to protect tires against excessive wear, to prevent skidding on slippery surfaces, and to give effective traction.

In carrying out the above end, the armor embodies a flexible, non-metallic tire-engaging member preferably formed of laminations of rubber and fabric, and this member carries a plurality of metal calks having riveted shanks passing through said member. It is a further object of the invention to provide a new and improved way of attaching the calks to the armor in such manner that they are tenaciously held in place and no portions of the attaching means can injure either the armor or the tire to which this armor is applied.

With the foregoing in view, the invention resides in the novel subject matter hereinafter described and claimed, description being accomplished by reference to the accompanying drawing.

Fig. 1 is a fragmentary side elevation showing a continuous armor constructed in accordance with my invention and connected by hooks with conventional side chains.

Fig. 2 is a plan view of a portion of the armor shown in Fig. 1.

Fig. 3 is an enlarged detail sectional view on line 3—3 of Fig. 2 showing about the relation of tread member, calk and tire tread when the calk is not supporting a portion of the load.

Fig. 4 is a view similar to Fig. 3 but illustrating the calk partly embedded in a roadway or the like and illustrating the relation of parts which occurs when the calk is receiving part of the load.

Figs. 5 and 6 are plan views showing different forms of construction.

The structure shown in Figs. 1 to 4 will first be described. This structure embodies a continuous armor 7 preferably formed of laminations of rubber and fabric. This armor 7 embodies two continuous laterally spaced strap-like portions 8 connected at spaced intervals by straight transverse strap-like portions 9 which are integrally joined thereto. Cross-shaped portions 10 are disposed between the strap portions 9 and are integrally joined to the latter and to the continuous strap-like portions 8, the portions 8—9—10 co-operating in forming an effective tread. Lateral strap-like portions 11 are integral with the strap-like portions 8 and are disposed in alinement with the portions 9, the outer ends of said portions 11 being provided with grommets 12 or with other means facilitating their connection with conventional side chains 13. Hooks 14 may be engaged with the grommets 12 and with the chains 13 as illustrated in Fig. 1.

A plurality of metal calks 15 are provided for the above described tread. Some of these calks are secured upon the continuous strap-like portions 8 of the armor at the juncture of these portions 8 with the portions 9—11, at which portions there is such an amount of material as to prevent possible weakening by the calk-securing hole, hereinafter obvious. The remainder of the calks 15 are disposed at the centers of the cross-shaped portions 10, at which locations there is also ample material to obtain solid anchorage of the calks. In Figs. 3 and 4, the way of securing one of the calks 15 to one of the strap-like portions 8, is shown in detail. The other calks are fastened to the armor in the same way and hence further illustration will not be necessary.

Inner and outer, thin, spring-metal washers 16—17 contact with the inner and outer sides of the armor, the calk 15 contacts with the outer side of the washer 17, and a thick rigid washer 18 contacts with the side of the washer 16 which faces the tire 19. The calk 15 is provided with an integral attaching shank 20 which passes through the three washers 16—17—18 and is upset against said washer 18 to tightly secure the parts assembled. Both the calk 15 and the washer 18 are of considerably less diameter than the thin resilient washers 16—17, leaving the peripheral portions of the latter projecting and free to flex, as will be clear from Fig. 4.

When the calk 15 is not supporting weight, it and its associated washers 16—17—18, are related with the tire 19 in about the manner shown in Fig. 3. When the calk engages a roadway or other supporting surface however and supports part of the load, the armor is inwardly distorted somewhat and the washer 18 must inwardly distort the tire 19 to some extent. When this distortion of the armor and tire tread occurs, the washer 16 yields into concavo-convex form as shown in Fig. 4 instead of injuring the tread of the tire. Similarly, the outer washer 17 yields into concavo-convex form instead of injuring the armor. Then too, this washer 17 prevents the calk 15 from cutting into the armor. As soon as the calk is freed from the roadway or the like, the parts return to the normal relation shown in Fig. 3.

By anchoring the calks 15 in the manner shown and described, they are tenaciously secured with no danger of pulling out. Any outward strain on a calk is distributed by the washer 18 and the resilient washer 16 over a large area at the inner side of the armor. Similarly, any inward strain upon the calk is distributed by the washer 17 over a large area of the armor. No matter how far the calks may inwardly distort the armor and the tire tread, neither this calk nor the washers 16—17 can injure the armor or the tread, and even though the calk might be somewhat canted, the washers will then yield also and consequently will injure no parts. Preferably, the calks are absolutely flat at their road-engaging surfaces and are of a radial dimension in the neighborhood of one-fourth of an inch. I have found by long use of calks of this type that they wear down about evenly and always present sharp corners which serve very much like the corners of a skate blade to prevent slipping in any direction upon ice-covered surfaces.

Fig. 5 discloses an X-shaped tread member 7ª having lateral strap-like portions 11ª for connection to tire chains, calks 15ª being secured as above described at desired locations. A very similar construction is shown in Fig. 6, the tread member 7ᵇ being of double X-shape and provided where desired with calks 15ᵇ attached as above described.

On account of the excellent results obtainable from the details disclosed, they are preferably followed. However, within the scope of the invention as claimed, minor variations may be made.

I claim:—

1. A tire armor comprising a one-piece annular flexible non-metallic member to circumferentially surround a tire, said member embodying two continuous strap-like portions spaced apart laterally, a multiplicity of short transverse strap-like portions extending between and integrally joined to said continuous portions to form therewith a tread, a plurality of circumferentially spaced laterally projecting strap-like portions integrally joined to said continuous portions and having free outer ends provided with means facilitating their attachment to conventional side chains, and a multiplicity of metal calks secured to the aforesaid tread, some of said calks being disposed along said continuous portions and others of said calks being disposed on said transverse portions.

2. A tire armor comprising a one-piece annular flexible non-metallic member to circumferentially surround a tire, said member embodying two continuous strap-like portions spaced apart laterally, a multiplicity of straight circumferentially spaced strap-like portions extending between said continuous portions at right angles thereto and integrally joined therewith, cross-shaped portions between said transverse portions and integrally joined to the latter and to said continuous portions, laterally projecting strap-like portions integrally joined to said continuous portions in alinement with said straight transverse portions, the outer ends of said laterally projecting portions being free and provided with means for facilitating their attachment to conventional side chains, and a multiplicity of metal calks secured to the aforesaid member, some of said calks being disposed along said continuous portions at their juncture with said transverse and laterally projecting portions, others of said calks being disposed at the centers of said cross-shaped portions.

In testimony whereof I have hereunto affixed my signature.

VINCENT J. AUCIUNAS.